(12) United States Patent
Lin (10) Patent No.: US 7,149,753 B2
(45) Date of Patent: Dec. 12, 2006

(54) PROVIDING SELECTIVE ACCESS TO TRACKING INFORMATION

(75) Inventor: Tao Lin, Mountain View, CA (US)

(73) Assignee: SAP Aktiengesellschaft, Walldorf (DE)

( * ) Notice: Subject to any disclaimer, the term of this patent is extended or adjusted under 35 U.S.C. 154(b) by 541 days.

(21) Appl. No.: 10/136,861

(22) Filed: Apr. 30, 2002

(65) Prior Publication Data

US 2004/0193641 A1 Sep. 30, 2004

Related U.S. Application Data

(60) Provisional application No. 60/353,441, filed on Feb. 1, 2002.

(51) Int. Cl.
G06F 17/30 (2006.01)
(52) U.S. Cl. ...................... 707/104.1; 707/10
(58) Field of Classification Search ............. 707/104.1, 707/7, 102, 8, 100, 9, 10; 709/241, 246; 713/168; 705/28, 23; 340/572.1; 455/422.1; 700/116, 113, 225
See application file for complete search history.

(56) References Cited

U.S. PATENT DOCUMENTS

| | | | | |
|---|---|---|---|---|
| 4,974,166 | A | 11/1990 | Maney et al. ............... | 700/113 |
| 5,166,884 | A | 11/1992 | Maney et al. ............... | 700/113 |
| 5,469,363 | A | 11/1995 | Saliga ........................ | 700/225 |
| 5,936,527 | A | 8/1999 | Isaacman et al. ......... | 340/572.1 |
| 5,963,134 | A * | 10/1999 | Bowers et al. ........... | 340/572.1 |
| 5,971,592 | A | 10/1999 | Kralj et al. ................. | 700/225 |
| 6,021,443 | A | 2/2000 | Bracho et al. ............. | 709/241 |
| 6,032,127 | A | 2/2000 | Schkolnick et al. ........ | 705/23 |
| 6,148,291 | A | 11/2000 | Radican ..................... | 705/28 |
| 6,177,860 | B1 | 1/2001 | Cromer et al. ............ | 340/10.1 |
| 6,195,006 | B1 | 2/2001 | Bowers et al. ........... | 340/572.1 |
| 6,259,367 | B1 | 7/2001 | Klein ........................ | 340/572.1 |
| 6,292,894 | B1 | 9/2001 | Chipman et al. ........... | 713/168 |
| 6,301,621 | B1 | 10/2001 | Haverstock et al. ........ | 709/246 |
| 6,321,230 | B1 | 11/2001 | Joslin et al. ................ | 707/100 |
| 6,460,047 | B1 * | 10/2002 | Ambroziak .................. | 707/102 |
| 6,600,418 | B1 * | 7/2003 | Francis et al. ............ | 340/572.1 |
| 6,671,698 | B1 | 12/2003 | Pickett et al. ............. | 707/104.1 |
| 6,684,119 | B1 | 1/2004 | Burnard et al. ............ | 700/106 |
| 6,693,539 | B1 | 2/2004 | Bowers et al. ........... | 340/572.1 |
| 6,732,100 | B1 * | 5/2004 | Brodersen et al. ............ | 707/9 |
| 6,745,027 | B1 * | 6/2004 | Twitchell, Jr. ............ | 455/422.1 |

(Continued)

FOREIGN PATENT DOCUMENTS

DE 4341880 6/1995

(Continued)

OTHER PUBLICATIONS

Auto-ID Center Website—Technology Section, *Introduction to Auto-ID*, http://www.autoidcenter.org/technology, Jan. 7, 2002.

(Continued)

*Primary Examiner*—Jeffrey Gaffin
*Assistant Examiner*—Yicun Wu
(74) *Attorney, Agent, or Firm*—Fish & Richardson P.C.

(57) ABSTRACT

System and methods for communicating tracking information about tagged items. A tagged item is a tangible item that carries a self-identifying tag. The tracking information can be stored in the tag or in a document that is accessible through an item tracking system. The tracking information can be accessible by multiple consumers having different levels of access. The methods include methods for masking redundancies in the tracking information, filtering the tracking information, and controlling access to the tracking information.

15 Claims, 10 Drawing Sheets

U.S. PATENT DOCUMENTS

| | | | |
|---|---|---|---|
| 6,785,663 B1 * | 8/2004 | Wang et al. | 706/45 |
| 6,793,127 B1 * | 9/2004 | Alsafadi et al. | 235/375 |
| 6,843,415 B1 * | 1/2005 | Vogler | 235/385 |

FOREIGN PATENT DOCUMENTS

| | | |
|---|---|---|
| DE | 19623893 | 12/1997 |
| DE | 198 05 465 A1 | 8/1999 |
| DE | 19844631 | 4/2000 |
| DE | 19951060 | 5/2000 |
| DE | 19955120 | 5/2001 |
| DE | 101 26 527 A1 | 12/2002 |
| EP | 0 748 080 A1 | 12/1996 |
| EP | 0908643 | 4/1999 |
| EP | 0913758 A2 | 5/1999 |
| EP | 1174807 A1 | 1/2002 |
| GB | 2308947 | 7/1997 |
| WO | WO 00/26111 | 5/2000 |
| WO | WO 00/45324 | 8/2000 |
| WO | WO 02/19046 A1 | 3/2002 |
| WO | WO 02/47014 | 6/2002 |

OTHER PUBLICATIONS

Sylvia Tiisetso Khabele, *RFID Security, CSC400W: Network and Internetwork Security*, skhabele@cs.uct.ac.za, May 18, 2001.

Kevin R. Sharp, Senior Technical Editor, IDSystems.com, *Planning for RFID Ubiquity*, http://www.idsystems.com/reader/2000_07/plan0700.htm, Jul. 2000.

Raghu das et al., *The Internet of Things*, IDTechEx Ltd., http://www.idtechex.com/book9.html, 2001.

David L. Brock, *The Physical Markup Language*, MIT Auto-ID Center, Feb. 2001.

George Cole, *The little label with an explosion of applications*, Financial Times- FT.com http://news.ft.com/ft/gx.cgi/ftc?pagename=View&c=Article&cid=FT30414MGWC, Jan. 14, 2002.

EAN International, Uniform Code Council, Inc., *EAN.UCC White Paper on Radio Frequency Identification*, Nov. 1999.

Sanjay Sarma et al., *White Paper- The Networked Physical World*, MIT Auto-ID Center, Oct. 1, 2000.

John Stermer, *Radio Frequency ID: A New Era for Marketers?*, Consumer Insight, Winter 2001.

Mary Ann Falkman editor, *RFID smart labels track chilled foods door to door*, Packeting Digest, Nov. 2000.

Cheryl Rosen, *RFID Chips Put To The Test*, Informationweek.com, http://www.informationweek.com/story/IWK20010628S0008, Jul. 2, 2001.

M-Lab—A Joint Initiative of ETH Zurich and HSG, *The Mobile and Ubiquitous Computing Lab—Project Plan*, www.m-lab.ch, English version 1.02e, St. Gallen/Zurich, Jun. 21, 2001.

Rachel Melcer, *P&G's Vision*, Business Courier, May 18, 2001.

Elgar Fleisch et al., *From computing visions to show cases*, M-Lab, First M-Lab Steering Committee Meeting, Nov. 22-23, 2001, Zurich.

Charles J. Murray, *Motorola cuts bar code replacement effort*, EE Times, Nov. 16, 2001.

Savi Technology Inc. Press Release, *CHEP to deploy Savi Tecnology's Asset Management Software*, Nov. 6, 2001.

Jay Wrolstad, *American Airlines Deploys Wireless System to Monitor Cargo*, CRNDaily.com, Oct. 12, 2001.

Jay Wrolstad, *Wireless tags help grocers deliver fresh food*, CRMDaily.com, Oct. 2, 2001.

SAMSys, Inc. press release, *International Paper selects SAMSys Technologies as primary RFID reader supplier*, Jan. 5, 2001.

Infineon press release, *Infineon enters fast growing "smart label" market with my-d, defines new paradigim for cost effective radio frequency identification solutions*, Sep. 11, 2001.

MIT Auto-ID Center, MIT-AUTOID-WH-001, "The Networked Physical World", MIT Auto-ID Center, Dec. 2000.

David L. Brock, MIT Auto-ID Center, MIT-AUTOID-WH-002, "The Electronic Product Code", Jan. 2001.

Auto-ID Center, Technical Manual, "The Object Name Service", Version 0.5 (Beta), Oat Systems & MIT Auto-ID Center, Feb. 1, 2002.

KnowNow Product Brief: "KnowNow Architecture Overview", 2002.

Segall et al., "Content Based Routing with Elvin4" Jun. 2000.

White Paper, SAP® Consumer Products, From Demand Planning to Vendor Managed Inventory with SAP APO. "DRP and VMI for the Consumer Products Industry", 1999.

Checkpoint Systems Inc., *Electronic Signatures technologies support supply chain logistics*, Retail News vol. 2, 2001.

Sanjay Sarma, *Auto-ID Center: Lessons Learned*, Auto-ID Center-MIT, Nov. 23, 2001.

Hoffman, Kurt C., "Real-time Location Systems Take Asset Tracking to New Level," http://www.supplychainbrain.com/archives/10.01, Oct. 2001, 5 pgs., XP002259982.

"KnowNow Unveils 'n-way' EAI over the Internet," SEARCHWEBSERVICES, Jun. 28, 2001, 2 pgs., XP002259981.

Margulius, David L., "Dawn of Real-time enterprise," Infoworld, http://www.infoworld.com/article/02/01/17/020121fecta_1.html, Jan. 17, 2002, 2 pgs., XP002259980.

"FedEx and Technology—Maintaining a Competitive Edge," Gale Group Newsletter, Dec. 9, 1996, pp. 1-3, XP002961196.

Wang, You-ning, et al., "A GIS Based Information Integration Framework for Dynamic Vehicle Routing and Scheduling,", *Proceedings of the IEEE International Vehicle Electronics Conference*, Changchun, China, Sep. 6, 1999, pp. 474-479, XP010375965.

\* cited by examiner

| 01 | 0000A89 | 00016F | 000169DC0 |
|---|---|---|---|
| Header bits 0-7 | ePC Manager bits 8-35 | Object Class bits 36-59 | Serial Number bits 60-95 |

```
<SHIPMENT ID = 1234567>
    <ITEM_LIST NAME = "BASKETBALL" EPC_PREFIX = >
        <ITEM>
        <EPC> 01.000A89.00016F000169DC0 </EPC>
        </ITEM>
        <ITEM>
        <EPC> 01.000A89.00016F000169DC1 </EPC>
        </ITEM>
        <ITEM>
        <EPC> 01.000A89.00016F000169DCA </EPC>
        </ITEM>
                                            ⎯401
        •
        •
    </ITEM_LIST>                                ⎯404
<SHIPMENT>
```

*FIG._4b*

```
<SHIPMENT ID = 1234567>
    <ITEM_LIST NAME = "BASKETBALL" EPC_PREFIX = 01.00A89.00016F>
        <ITEM>                                          ⎯402
        <EPC> 000169DC0 </EPC>
        </ITEM>
        <ITEM>
        <EPC> 000169DC1 </EPC>
        </ITEM>
        <ITEM>
        <EPC> 000169DCA </EPC>
        </ITEM>    ⎯403
        •
        •
    </ITEM_LIST>
<SHIPMENT>
```

PROVIDING SELECTIVE ACCESS TO TRACKING INFORMATION

The present invention claims priority to U.S. patent application Ser. No. 60/353,441, filed Feb. 1, 2002 to Peter Ebert, et al. for Communications in an Item Tracking System, the disclosure of which is incorporated herein by this reference.

BACKGROUND

The present invention relates to methods of communication in a system for context-aware and real-time tracking (a "tracking system") of the kind described in commonly-owned, co-pending U.S. patent applications Ser. No. 60/347,672, filed Jan. 11, 2002, to Peter Ebert, for Context-Aware And Real-Time Tracking; Ser. No. 60/353,198, filed Feb. 1, 2002, to Peter Ebert, et al. for Item Tracking System Architectures and Scenarios; and Ser. No. 60/353,439, filed Feb. 1, 2002, to Peter Ebert, et al. for Unique Per-Item Identification in International Trade; the disclosures of which are incorporated here by this reference.

One of the advantages of radio frequency identification (RFID) technology is its use in logistics at the physical object level. Logistics systems work with item tracking systems to monitor automatically items and to update logistical information as needed. The information associated with items in tracking systems typically passes across different software systems and may cross enterprise boundaries. In order to support communications among software systems and enterprises, each item can be associated with a unique identification code (UID). One example of a UID is the electronic product code (ePC) proposed by the MIT-Auto ID Center.

SUMMARY

This specification describes mechanisms that allow information relating to large numbers of items to be passed efficiently.

In general, in one aspect, the invention features systems and methods for communicating tracking information. The methods include receiving a plurality of identification codes, each identification code uniquely identifying an associated physical object; sorting the plurality of identification codes into one or more sets of identification codes; recognizing a redundant portion of code that is common to each identification code within a set of identification codes; creating a document containing the one or more sets of identification codes; and organizing the document in a hierarchical structure such that for each set of identification codes, the redundant portion is listed once and each identification code is listed with the redundant portion omitted.

In general, in one aspect, the invention features systems and methods for filtering tracking information. The methods include retrieving a plurality of identification codes associated with a plurality of physical objects, the physical objects including items and containers of items, each identification code being a string of characters that uniquely identify the associated physical object; locating a character within each identification code that indicates whether the associated object is an item or a container; and based on the located character, determining whether each identification code corresponds to an item or a container.

In general, in one aspect, the invention features systems and methods for communicating tracking information about items. The methods include creating tracking information for a collection of items, the tracking information representing each of the items as one or more attributes and optional corresponding values; encoding the tracking information by encoding each instance of each distinct attribute in the tracking information with its corresponding distinct coding scheme; sending the encoded tracking information to a recipient; determining which attributes the recipient is authorized to access; and providing the recipient with a subset of the coding schemes, the subset including only coding schemes for attributes that the recipient is authorized to access.

The invention can be implemented to realize one or more of the following advantages. A system in accordance with the invention can mask the redundant portion of a UID to save memory or bandwidth during communications. The system can receive a set of UIDs read from different types of items and be able determine which type of item is identified by a particular UID. From this determination, the system can filter out UIDs pertaining to certain item types and provide a recipient with a filtered set of UIDs pertaining to only certain types of items.

A system in accordance with the invention can also provide selective access to tracking information. The system can provide the convenience of being able to send the same tracking information to all consumers, but at the same time, provide different levels of access to the information depending on the authorization level of the consumer. Specifically, the system can encode the tracking information, but only provide a given consumer with the means to decode a portion of the tracking information.

The encoding system can provide not only control of access but also efficient communication of the information. The system can replace descriptive text within the tracking information with coded text that is shorter than the descriptive text. If the tracking information is stored on a tag, this enables more information to be stored on the tag. If the tracking information is communicated across a network, this reduces the amount of bandwidth consumed by the information.

The details of one or more embodiments of the inventions are set forth in the accompanying drawings and the description below. Other features and advantages will be apparent from the description and drawings.

DESCRIPTION OF DRAWINGS

Like reference symbols in the various drawings indicate like elements.

DETAILED DESCRIPTION

Figure 1:
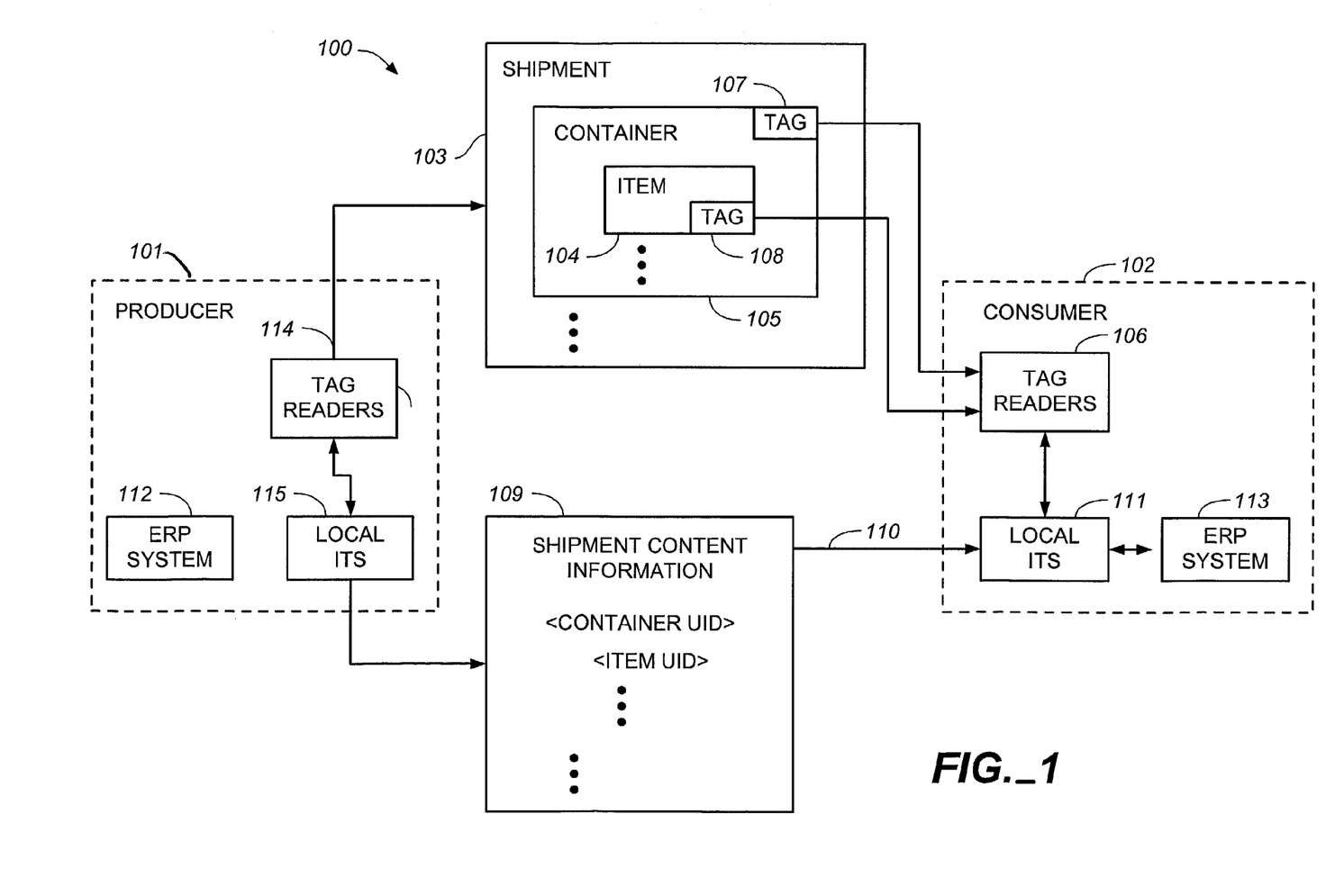
FIG. 1 shows a system architecture for communications between a producer and a consumer.

FIG. 1 shows a system architecture 100 for communications between a producer and a consumer. A producer or consumer can be a manufacturer, a distributor, or a retail establishment, or any other location or portion of a location, that deals with tagged items.

In this specification, the term 'item' has a very broad meaning. It encompasses the meaning of the term 'article' as used in the above referenced patent applications. For compatibility with ERP (enterprise resource planning), SCM (supply chain management), and logistics systems, the notion of an item includes everything normally implied when an item appears on a bill of materials, bill of lading, packing list, pick list, and so on. Thus, it includes any physical object that might have a location, be shipped, be sold to a consumer, and so on. It can also include any asset that is likely to be referenced in a corporate accounting or other business system, such as a shipment.

In the consumer goods and other areas, an item may not have any kind of item-specific tag. For example, a tagged case may include 48 bottles of soap, each of which has a bar code with the same UPC (universal product code) or other product number and each of which can be sold to a customer separately. A tracking system can correlate shipments that were tracked at the tag level with point of sale receipts which track individually priced items. Bar codes will not normally carry a UID, just an item type. The system can make some assumptions relating bar code data with tag data. Tagged case-level inventory at a supermarket or retailer can benefit from regular inventories using tag reader. Once a case disappears from inventory, the system assumes that the contents have been put on a retail shelf and may be sold in arbitrary order. If individual items are not identified, there is no way to carry the accuracy of the tracking system beyond the point where the tagged cases are opened.

A tagged item is a tangible item that carries a self-identifying tag. The tag might be associated with a single item (in the sense above) or it might be associated with a collection of items. Thus, to give just a few examples, a tagged item can be any of the following: an individual item, like a bottle of soap; an asset, like a tagged laptop; a case containing a collection of items of possibly various types, or a pallet containing many cases, and so on; a container; a truck or trailer; an airplane; a ship; and a railroad car.

Generally, a tag will be an RFID tag, but it need not be based on RF technology. For example, a tag can be implemented to be read by optical, magnetic, magneto-optical, or other technology, either with or without physical contact between the tag and the reader. Moreover, the tag can be passive (containing no internal power source for communications and data transmission) or active; and it can have processing capacity or not. In this specification, a tag should be understood to be a digitally identifiable tag, meaning that the tag has the property that a UID can be read directly from the tag using some kind of reader. Some digitally identifiable tags can also be written to, not merely read from. Writeable tags offer extra advantages in cases where information needs to be made available without dependence on a communication network.

The system illustrated in FIG. 1 includes ERP systems 112, 113, which can be any local enterprise software that is used for managing the movement and storage of goods. The ERP system for each enterprise or part of an enterprise may be different from each other.

The illustrated system also has tag readers 106, 114. Each producer or consumer can have multiple tag readers that feed digital information from digitally identifiable tags into a local item tracking system (ITS). Some implementations optionally have intervening hardware and software between the actual physical readers and the ITS. Readers can be positioned on manufacturing lines, in storage locations, in shipping and receiving areas, at loading docks, within trucks or other moving vehicles, and can also be hand-held wireless connected devices. Generally, a tag reader can be any combination of hardware and software capable of feeding digital data collected from any item or container tag.

Tag readers can be introduced to the tracking system dynamically. A reader can be a real, physical low-level reader that communicates with the system directly, or a virtual reader that is created by an external system for providing data to the system. For most situations these can be treated identically.

Each reader has properties that generally include the following: a system-wide UID; an owner; a type: fixed or mobile; a location (e.g., latitude and longitude); a stocking location name (e.g., warehouse 3, section 6, loading bay 12); a manufacturer and manufacturer type; and the types of tags recognized.

The system also includes local ITSs 111, 115. Each local ITS is a system of hardware and software that can be implemented on one or more computer systems. A local ITS is typically geographically local to the other parts of the enterprise but physically it can be located anywhere provided it has appropriate connections to the local ERP system and the tag readers. Normally, a local ITS serves a single enterprise or a portion of that enterprise. Thus, when there are more than one local ITS, each can be operated by a different enterprise. An ITS can also connect to other existing enterprise software systems, such as those used for supply chain management, logistics, customer relationship management, and new software services which are enabled by the kind of data available form the ITS.

In one scenario, a producer 101 sends a shipment 103 to a consumer 102. The shipment 103 includes several tagged items 104 in a tagged container 105. When the consumer 102 receives the shipment 103, the consumer's tag reader system 106 reads the information from the container tags 107 and the item tags 108. In order to verify the shipment 103, the consumer 102 needs shipment content information 109 from the producer 101. This shipment information 109 can include the UID of the container and the UIDs of all the items in the container. Other information associated with each item, such as the color of the item, can be packed with the UID of the item or stored externally to the tag. Through a communications network 110, e.g., the Internet, the consumer 102 can receive shipment information 109 from the producer 101 and can also send status update information to the producer 101. The local ITS 111 at the consumer's site retrieves information from the tag reader system 106 and matches the tag information against the shipment information 109.

Figure 2:
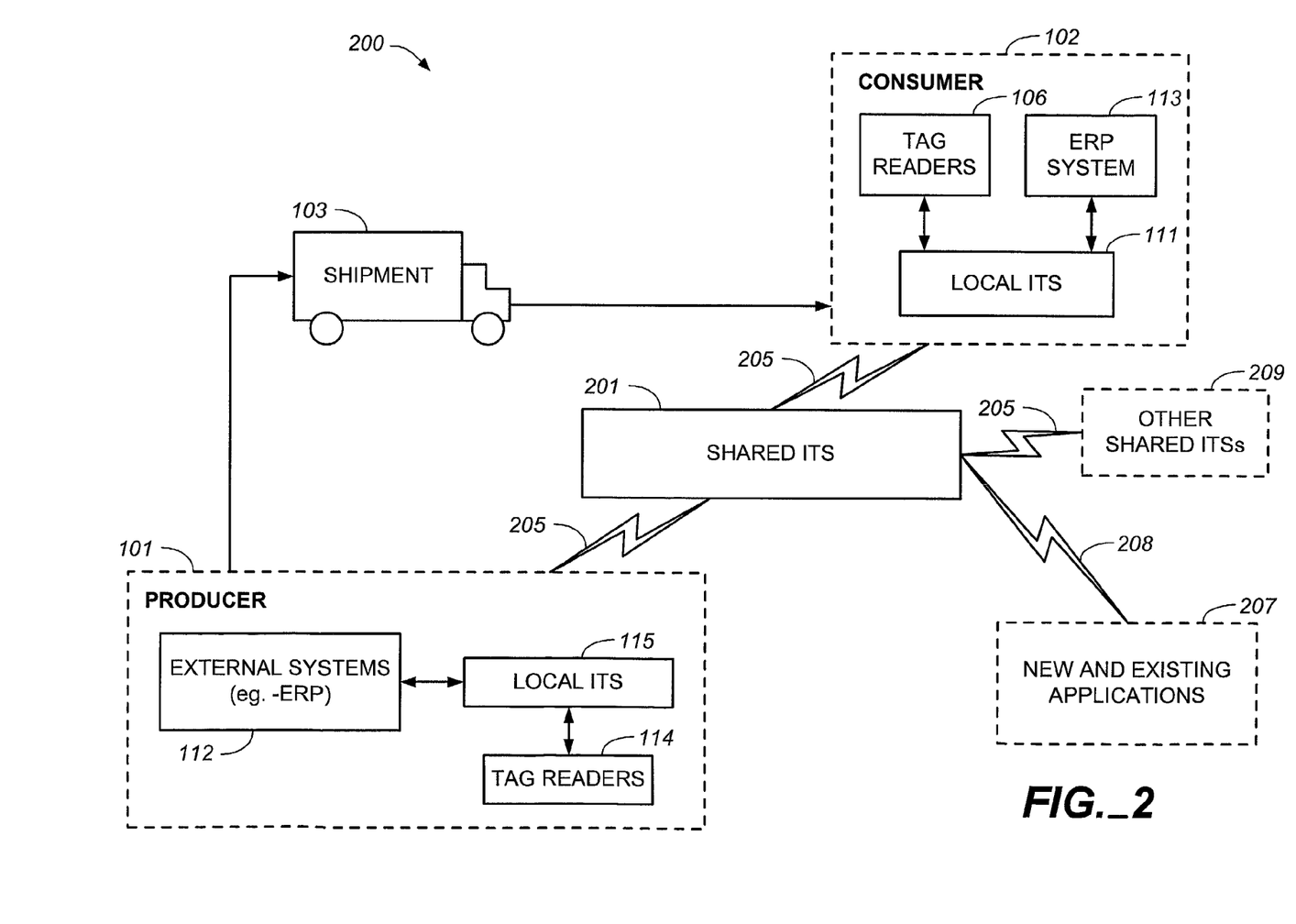
FIG. 2 shows a system architecture for communications between a producer and a consumer using a shared item tracking system.

FIG. 2 shows a system architecture 200 for communications between a producer and a consumer using a shared ITS 201. A shared ITS is an ITS that is shared by multiple local ITSs. It connects generally to multiple local ITSs and can also connect to multiple other shared ITSs 209. A shared ITS can also connect to other existing and new applications 207 as described below.

Local and shared ITSs can communicate over any computer-to-computer communications technology 205. Generally, between enterprises, this will be encrypted for security, and digital security certificates or other security means will be used to authenticate participants in the communication. The communication medium may include the public Internet. This connection normally passes real-time, or close to real-time, messages representing the disposition of tagged items and other information representing shipping documents, transport vehicles, and so on.

Through a connection 208, new and existing applications 207 can interrogate the ITS about the current state and past history of the items tracked by the ITS and other information. These queries do not change the state as recorded in the ITS system, and so can be handled—with little or no loss of usefulness—by processing a log of the states of the ITS kept in a persistent store, which can easily be replicated to scale up the systems, rather than by processing the queries on live data in the ITS. The new and existing applications 207 can be existing enterprise software systems, such as those used for supply chain management, logistics, customer relationship management, as well as new software services that are enabled by the kind of data available form the ITS.

In using system 200, the producer 101 need not directly send any shipment information to the consumer 102. Instead, the producer 101 sends the shipment information to a shared ITS 201 which is accessible by the consumer 102, and also by other producers and consumers such as shipping companies, customs offices and other intermediaries involved in delivering the shipment from the producer 101 to the consumer 102. These other producers and consumers can also use the shipment information stored on the shared ITS 201 and contribute additional tracking information such as status and customs clearance. When the consumer 202 receives the shipment 103, it can cross reference the tag information retrieved from the shipment with the information contained in the shared ITS 201 to retrieve the shipment information for the shipment 103.

Figure 3:
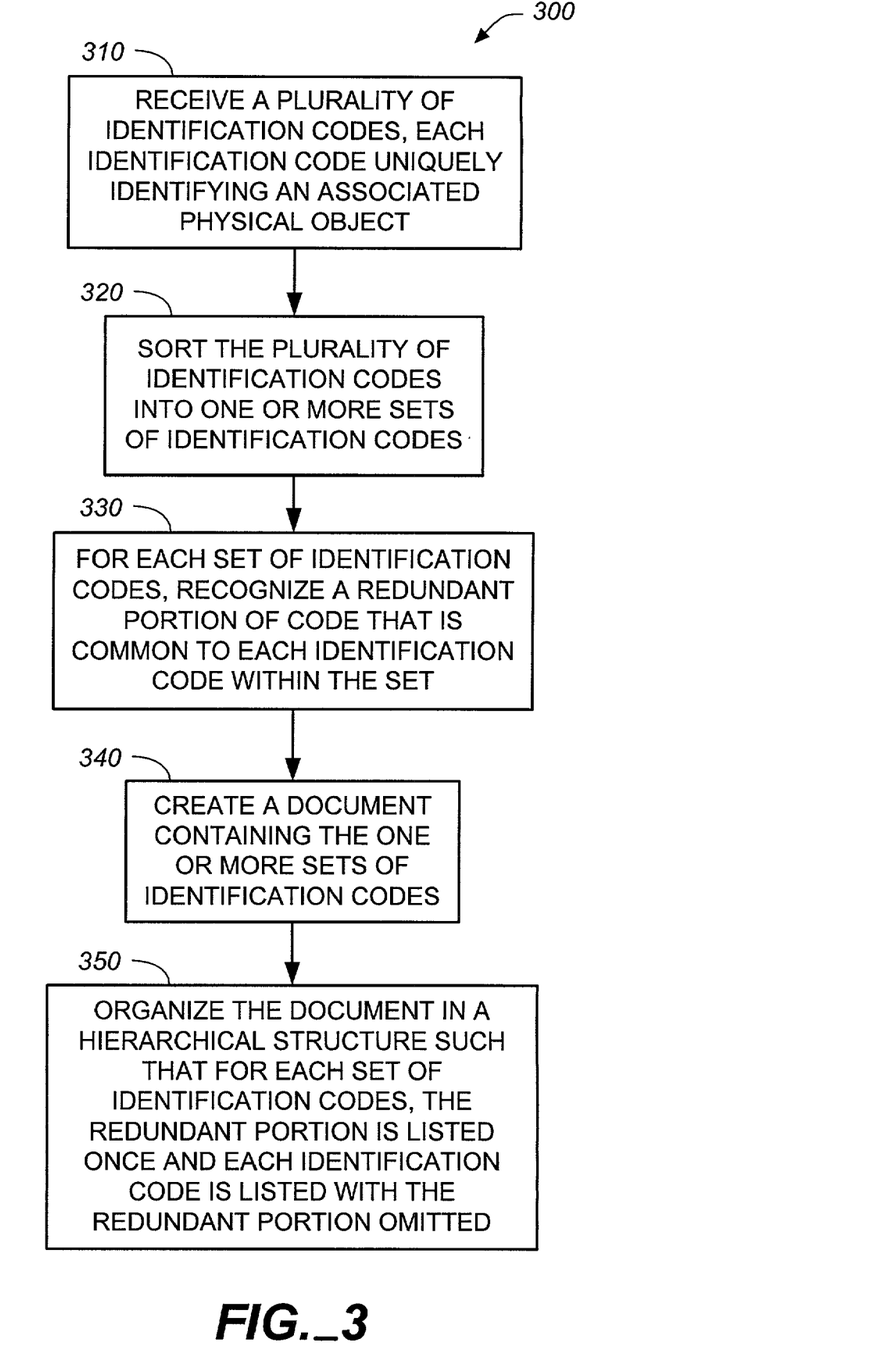
FIG. 3 shows a method for communicating tracking information.

As shown in FIG. 3, a method 300 for communicating tracking information between a producer and a consumer can begin with a producer receiving a plurality of identification codes, each identification code uniquely identifying an associated physical object (310).

Figure 4A:
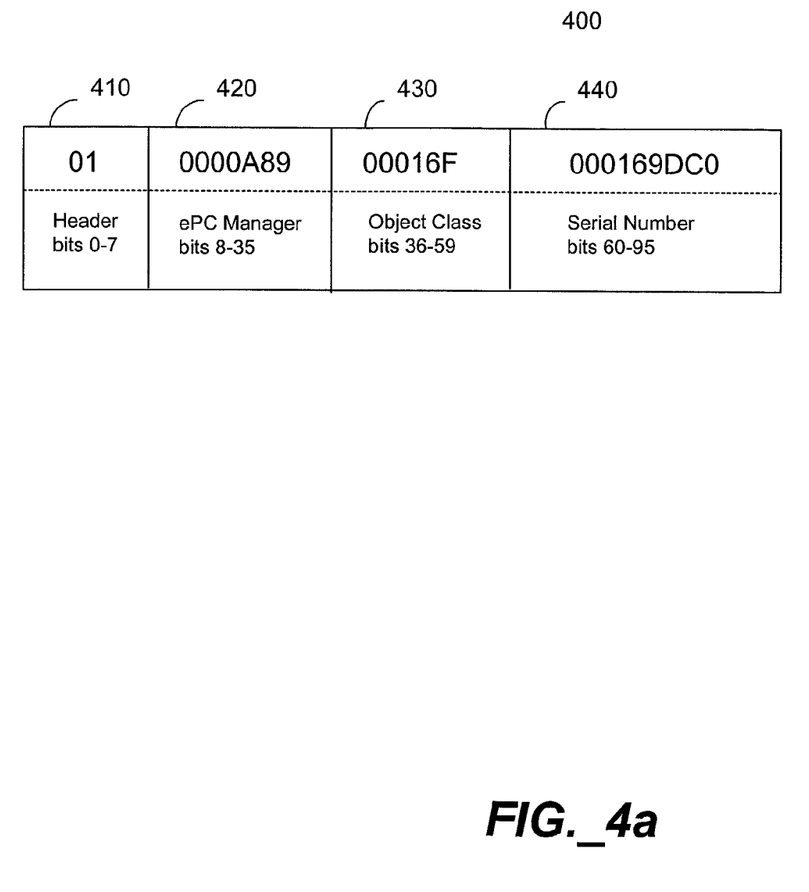
FIG. 4a shows the structure of an electronic product code (ePC).

The identification codes can be read from tags bound to the physical objects. To make cross-enterprise object tracking possible, each tag carries a unique identification code for the associated physical object, for example, the electronic product code (ePC) 400 shown in FIG. 4a. An ePC 400 is 96-bits, partitioned into an 8-bit header (bits 0–7) 410 and three data fields: ePC Manager (bits 8–35) 420, Object Class (bits 36–59) 430, and Serial Number (bits 60–95) 440. Each organization that can tag items has a unique code for the ePC Manager field. Each product category in an organization has a unique code in the Object Class field. Each individual item of a product has a unique code in Serial Number., UIDs other than ePCs may be used similarly.

The producer sorts the identification codes into one or more sets of identification codes (320). Each set of identification codes can correspond to a particular type of item (eg. all the basketballs from a given manufacturer).

Figure 4B:
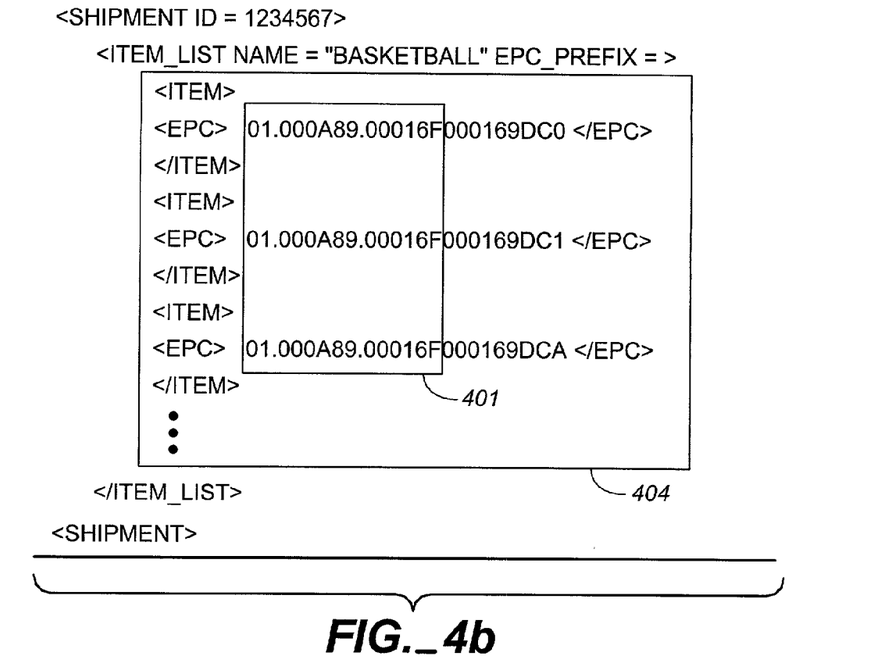
FIG. 4b shows a shipment document without masking.

For each set of identification codes, the producer recognizes a redundant portion of code that is common to each identification code in the set (330). For example, as shown in FIG. 4b, the ePCs for all basketballs from a given manufacturer contain a redundant portion 401—specifically, the ePCs share the same ePC Manager and Object Class. This redundancy is inherent in the hierarchical structure of the ePC.

The producer creates a document containing the one or more sets of identification codes (340). However, in such a document, the ePCs can account for a large percentage of the document size. For example, as shown in FIG. 4b, a shipment document contains item-level information, including the ePC for every item shipped. When the number of items increases, the ePCs become a significant part of the document's size.

Figure 4C:
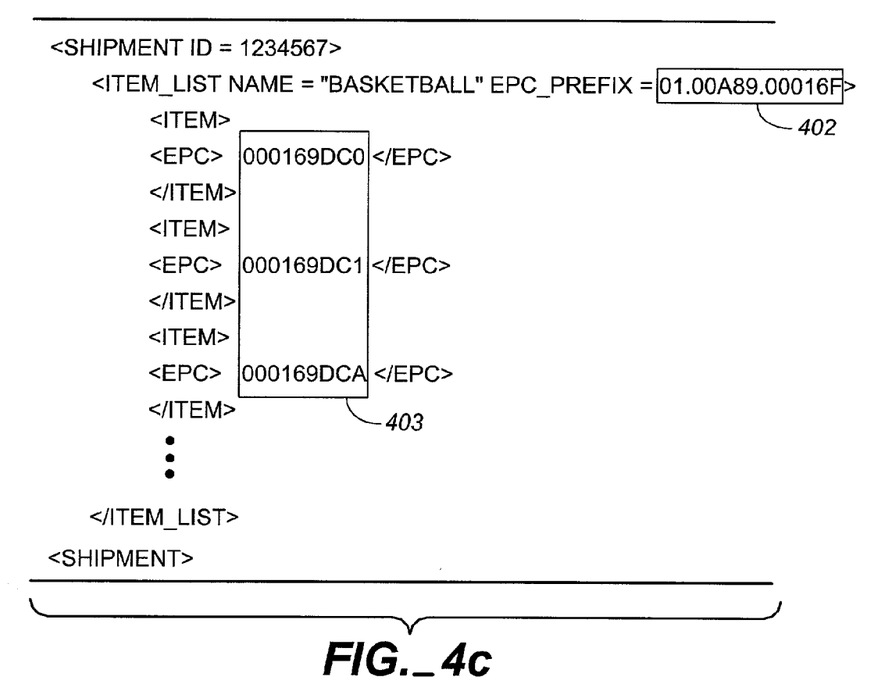
FIG. 4c shows a shipment document with masking.

To reduce the size of the document, the producer 101 organizes the document such that for each set of identification codes, the redundant portion of the code is listed once and each tag is listed with the redundant portion of the code omitted (350). In this way, the hierarchical design of the ePC can be leveraged to compress the information associated with each ePC. For example, for all basketballs packaged and shipped to one location, there is no need to include the entire ePC of each basketball in the shipping document. Instead, as shown in FIG. 4c, the shipment document can include just one entry for the ePC Manager and Object Class in an ePC prefix 402, and just the Serial Numbers 403 for each of the individual basketballs that are shipped.

A masking technique similar to method 300 can be applied to other contexts besides shipping. For example, masking can be applied in the production context to reduce the size of production orders. In preparation for manufacturing a new line of items, a factory typically generates a production order which lists the ePC for each of the items. This is the case even when the header, ePCManager, and object class portions of each ePC are the same. By applying method 300 to the production order, this redundancy can be eliminated and instead of listing the full ePCs for each item, the redundant portion can be omitted and only the serial number be listed.

Further reduction in the size of the document (shipping, production or otherwise) can be obtained by recognizing that when the serial numbers are sequential, it is not necessary to list the serial numbers for every item produced. Instead, as shown below, all that needs to be listed is the serial number for the first item created ("EPC_BASE") and the total quantity of items produced (e.g., 1000). Additional information for each item, such as the color of the item, can be listed individually for each item as shown below.

```
<PRODUCTION_ORDER ID=1234566>
    <ITEM_LIST QUANTITY=1000 EPC_PREFIX=
    01.000A89.00016F>
        <EPC_BASE>00168123</EPC_BASE>
        <ITEM>
            <COLOR> RED </COLOR>
        </ITEM>
        <ITEM>
            <COLOR> BLUE </COLOR>
        </ITEM>
        <ITEM>
            <COLOR> RED </COLOR>
        </ITEM>
    </ITEM_LIST>
        .
        .
        .
</PRODUCTION_ORDER>
```

Filtering

Along a supply chain, there will generally be items that are tagged and items that are not tagged. Furthermore, only some types of items, such as pallets or packages, may be tagged with RFIDs. Additionally, each enterprise may tag items. For example, a transportation company can tag its shipment packages to automate its own logistic processes. Thus, there may be RFID tags at the item, the package, the pallet, and the container level, and these tags may be from different enterprises. However, a simple reader/interrogator cannot distinguish, for example, a container of items from an item. As a result, all UIDs that are read must be reported to a central system and filtered. This process is inefficient and very burdensome to a system that must handle millions of reports in a day.

The ePC manager for an enterprise controls the assignment of object class and serial numbers. The enterprise may define its own schema for physical objects that serve as accessories to the items produced by the enterprise. For example, pallets and packages produced by manufactures may or may not have their own ePC tags. However, within the context of a transportation company, there are containers for the actual items shipped. The process of transferring shipments from one dock to another is expedited by checking only the pallet or package, not the entire contents of the pallet or package. This approach requires that the transportation company tag the containers with its own ePC.

Readers can be configured to acquire only a certain type of ePC pattern. For example, readers may be configured to register only containers that start with character '1' in the object class portion of the ePC. The actual XML filtering schema would look like:

<Container_Class>01.1234566.1XXXXX</Container_Class>

In this example, the Xs are wildcards within the string of characters that form the ePC; the reader will accept any data at these positions. Configuring a reader in this way allows the reader to filter the ePCs that it reads, and check only the container type that is indicated in the schema. Thus, filtering can reduce the messages sent from the reader to the monitoring application or process, such as a shipment confirmation process.

Figure 5:
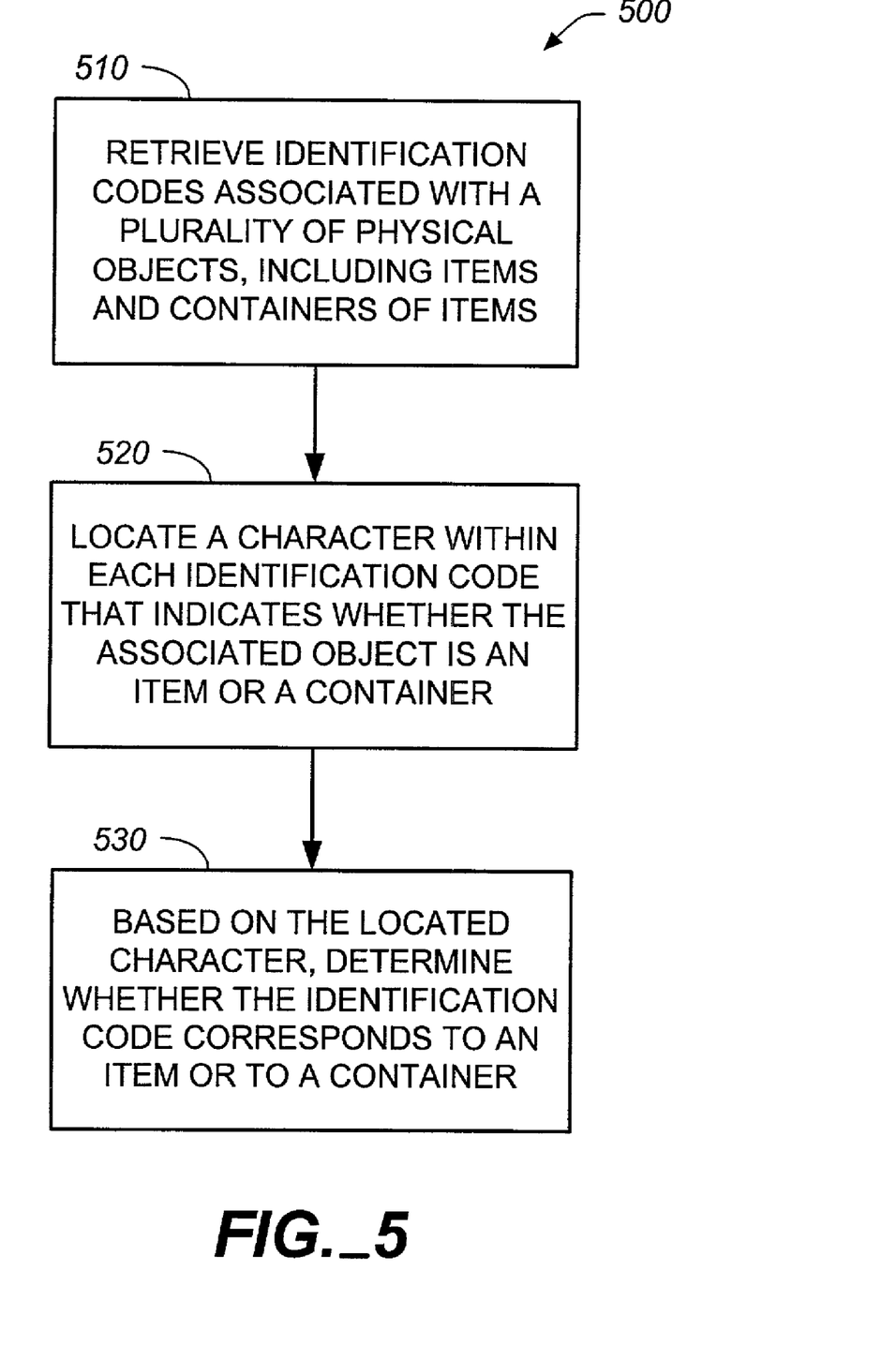
FIG. 5 shows a method for filtering tracking information.

FIG. 5 shows a method 500 for filtering tracking information. Filtering can occur by readers or reader systems at various stages within the delivery process (i.e., by various consumers) and also at various levels within a particular consumer. For example, as described above, filtering can occur at the tag-reader-level. Alternatively, or additionally, a consumer's ITS can also filter the data it receives from the tag readers.

Identification codes associated with a plurality of physical objects, including items and containers of items, are retrieved (510). Each identification code (e.g., ePC) is a string of characters that uniquely identifies the associated physical object. The identification codes can be retrieved from various sources such as from a tag reader, from a shipment document, or from an ITS (shared or local).

A character is located within each identification code that indicates whether the associated object is an item or a container (520). As described above, the containers can be distinguished from items in that containers have a "1" as the first character of the object class portion of the code; however, other characters and character positions can be used. Based on the located character, a determination is made as to whether the identification code corresponds to an item or to a container (530).

When such a determination is made at the tag-reader level, the tag reader can distinguish items from containers of items, and use this distinction to filter out reads that are not relevant to the recipient of the read information. For example, if the recipient is a shipping company, it may only want to know the tag information for each container of items, but not for the items themselves. In such a case, the reader itself or a component at a high level in the system can filter out the codes for items and only send the tag information pertaining to containers to the recipient.

Controlling Access to Tracking Information

In a cross-enterprise computing environment, the tracking information can be consumed by multiple consumers. However, the producer may not necessarily want all consumers to share the same degree of access. For example, the manufacturer may record information about a shipment, such as "responsible person" or "quality grade", which some consumers (e.g., customs offices) are authorized to access, but which other consumers (e.g., retailers) are not authorized to access.

In one implementation, access to tracking information is controlled by providing the consumer with only a portion of the document. For example, a shipping company may only need to know the total quantity of goods shipped, but the shipping company may not need to know (or be authorized to know) other attributes of the goods (e.g., color, price).

However, it can be more efficient simply to send the same encoded document to all consumers. Thus, an alternate implementation provides the same document to all consumers, but in an encoded format. Then each consumer is separately provided with a selective means for decoding only a portion of the document. The encoding and decoding can be completely transparent to external systems 112, e.g., an ERP system. In other words, the input and output of the tracking system can be a plain unencoded document.

Figure 6:
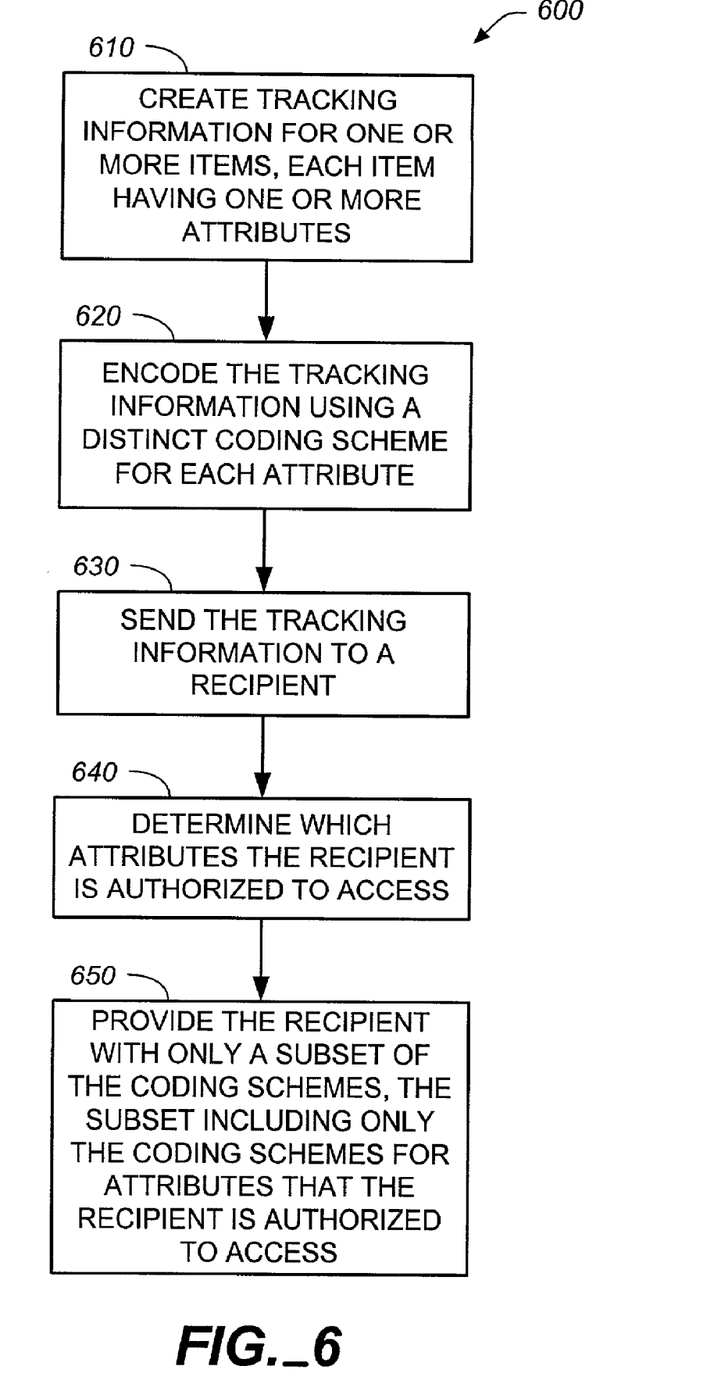
FIG. 6 shows a method for communicating tracking information.

As shown in FIG. 6, in performing a method 600 for controlling access to tracking information, a producer creates tracking information for a collection of items, the tracking information representing each of the items as one or more attributes and optional corresponding values (610). The producer encodes the tracking information by encoding each instance of each distinct attribute in the tracking information with its corresponding distinct coding scheme (620). The producer sends the encoded tracking information to a recipient (630), determines which attributes the recipient is authorized to access (640), and provides the recipient with a subset of the coding schemes (650), the subset including only coding schemes for attributes that the recipient is authorized to access.

Method 600 can be performed at various points during the tracking process, such as before the tracking information is stored on a tag or before the tracking information is deposited in a shared ITS. Method 600 can be performed whenever tracking information is being released and the sender desires to control access to the tracking information.

Figure 7:
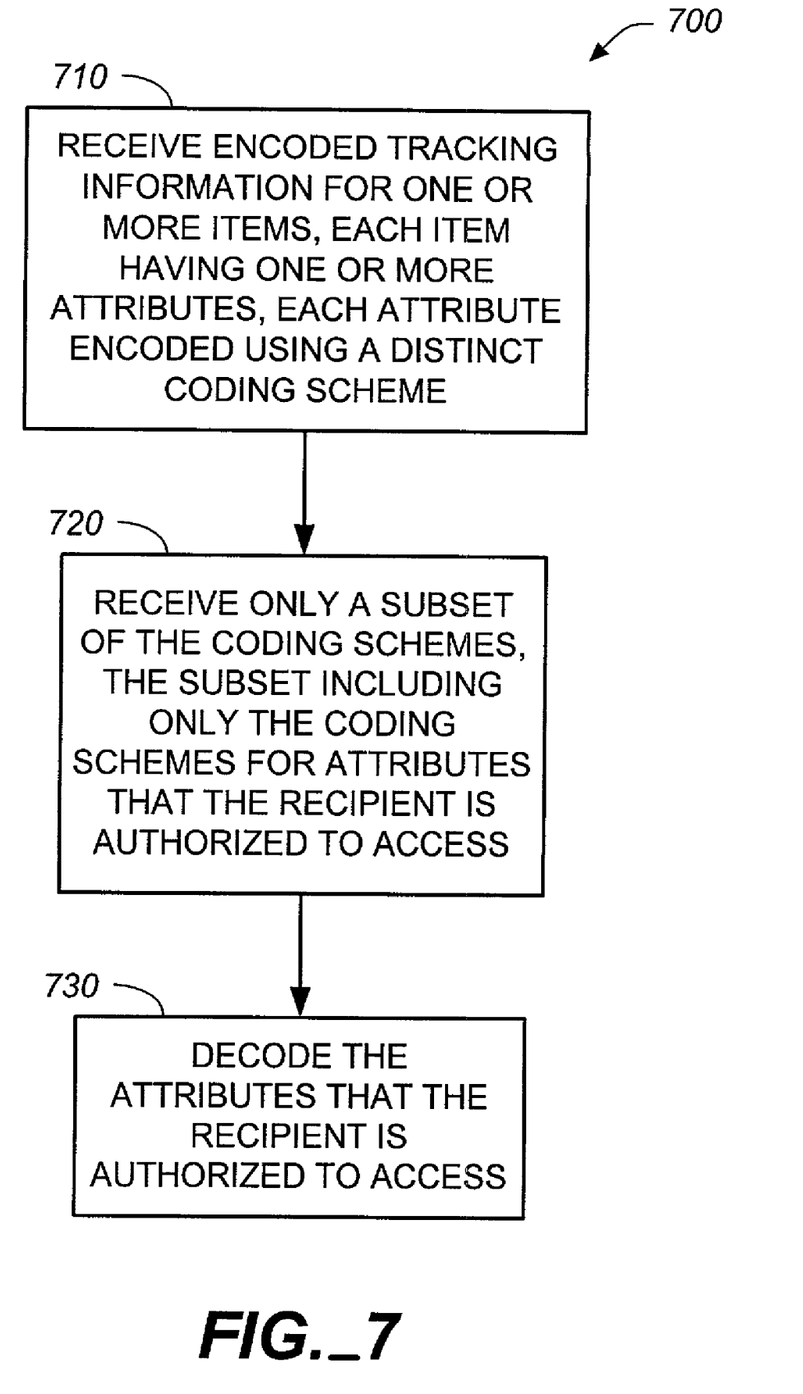
FIG. 7 shows a method for accessing tracking information.

As shown in FIG. 7, in performing a method 700 for accessing tracking information, a consumer receives encoded tracking information for a collection of items, the tracking information representing each of the items as one or more attributes and optional corresponding values, the tracking information encoded by encoding each instance of each distinct attribute in the tracking information with its corresponding distinct coding scheme (710). The consumer also receives a subset of the coding schemes, the subset including only coding schemes for attributes that the recipient is authorized to access (720). Finally, the consumer decodes the attributes that the recipient is authorized to access (730).

The tracking information can be stored in an XML document as part of a tag associated with a physical object.

Through a reader, a consumer can retrieve the XML document from the tag. Alternatively, the consumer can also retrieve an XML document from another location, for example, from a shared ITS or another computing system.

A Document Type Definition (DTD) or an XML schema defines the metadata of an XML document. A DTD can be included in an XML document or stored separately. For example, a DTD called Product, shown in the following table, the attribute fields of ProductType, ProductID, Version, Vendor, SalePrice, ProducePlace, ProduceTime, ExpireTime, ResponsiblePerson, QualityGrade, and Weight:

```
<?xml version="1.0" encoding="UTF-8"?>
<!ELEMENT Product (ProductType, ProductID, Version, Vendor,
SalePrice, ProducePlace,
    ProduceTime, ExpireTime, ResponsiblePerson, QualityGrade)>
<!ELEMENT ProductType (#PCDATA)>
<!ELEMENT ProductID (#PCDATA)>
<!ELEMENT Version (#PCDATA)>
<!ELEMENT Vendor (#PCDATA)>
<!ELEMENT SalePrice (#PCDATA)>
<!ELEMENT ProducePlace (#PCDATA)>
<!ELEMENT ProduceTime (#PCDATA)>
<!ELEMENT ExpireTime (#PCDATA)>
<!ELEMENT ResponsiblePerson (#PCDATA)>
<!ELEMENT QualityGrade (#PCDATA)>
    <!ELEMENT ProductSet (Product+)>
```

An XML document based on this DTD file is shown in the following table:

```
<?xml version="1.0" encoding="UTF-8">
<!DOCTYPE ProductSet SYSTEM "ProductSet.dtd">
<ProductSet>
    <Product>
        <ProductType>XXXX</ProductType>
        <ProductID>45EF76345</ProductID>
        <Version>E3DF67</Version>
        <Vendor>AAA</Vendor>
        <SalePrice>1988-12-28</SalePrice>
        <ProducePlace>621</ProducePlace>
        <ProduceTime>2000-12-28</ProduceTime>
        <ExpireTime>2002-12-28</ExpireTime>
        <ResponsiblePerson>Kelly De</ResponsiblePerson>
        <QualityGrade>6</QualityGrade>
    </Product>
    <Product>
        <ProductType>XXXY</ProductType>
        <ProductID>45E003123</ProductID>
        <Version>9FD56</Version>
        <Vendor>BBB</Vendor>
        <SalePrice>3.4</SalePrice>
        <ProducePlace>621</ProducePlace>
        <ProduceTime>2000-02-28</ProduceTime>
        <ExpireTime>2002-02-28</ExpireTime>
        <ResponsiblePerson>Kevin Smith</ResponsiblePerson>
        <QualityGrade>8</QualityGrade>
    </Product>
</ProductSet>
```

Figure 8:
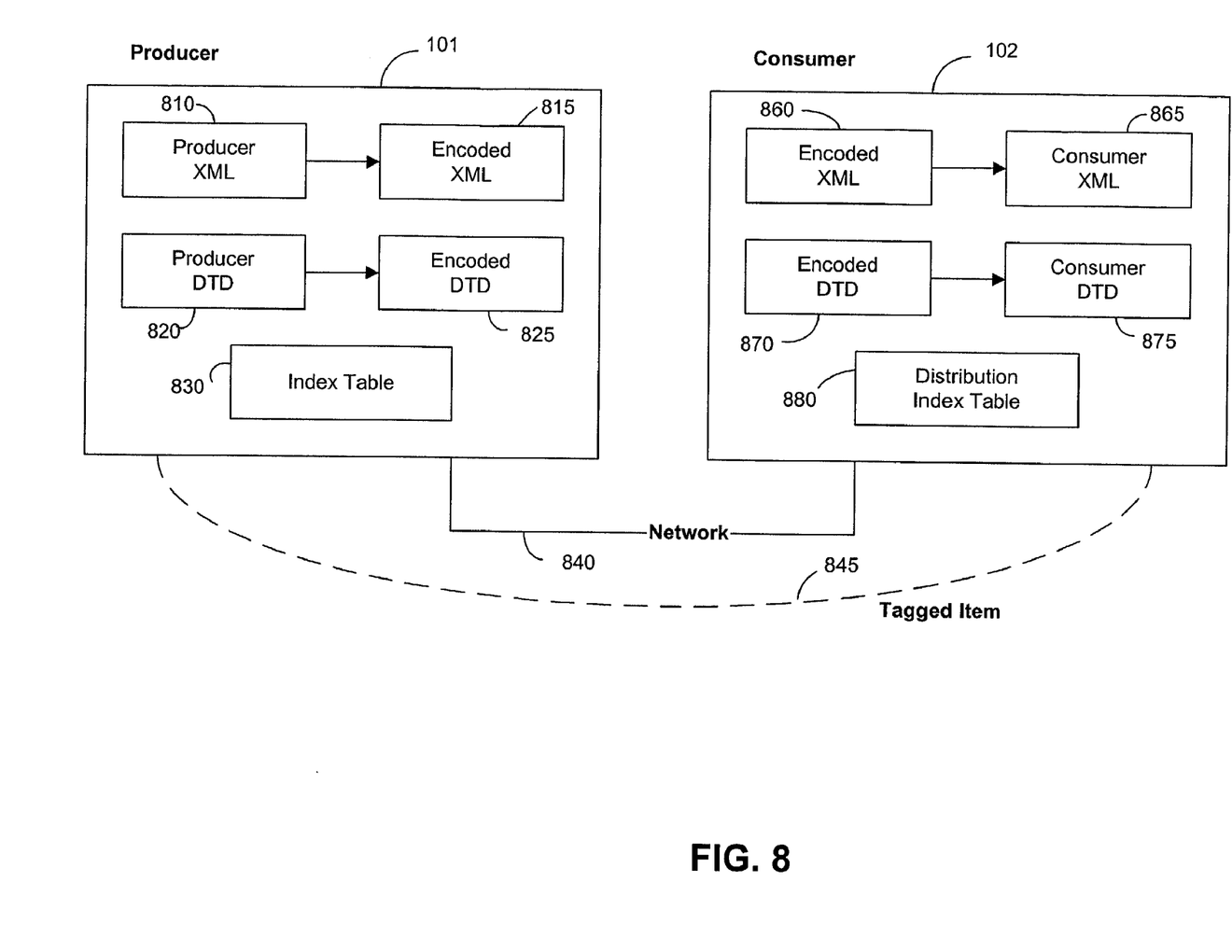
FIG. 8 shows a system of documents, index tables, and encoded documents used in communicating tracking information.

FIG. 8 shows a system of documents, index tables, and encoded documents used to communicate tracking information in a network 840 with tagged items 845. A producer 101 uses an index table 830 to convert a Producer XML document 810 to an encoded XML document 815. The index table can also be used to convert a producer DTD file 820 to an encoded DTD file 825. The consumer receives the encoded XML or encoded DTD file 860/870 from the producer over the network. The consumer uses a destination index table to convert the encoded XML document to a consumer XML document 865, or the encoded DTD file to a consumer DTD file 875. The consumer uses the consumer XML document or the consumer DTD file.

The index table 830 is used to generate XML documents on the producer side. An index table relates tag names to index values. Each attribute field has a corresponding tag name that describes the attribute. Optionally, each attribute field also has a corresponding value. The tag name is generally descriptive and the index is a coding of the tag name. The coding should selected so as be efficient for the anticipated number of tags. An index table for handling the ProductSet XML document discussed above could be as follows:

| Tag Name | Index |
| --- | --- |
| Product | 1 |
| ProductType | 2 |
| ProductID | 3 |
| Version | 4 |
| Vendor | 5 |
| SalePrice | 6 |
| ProducePlace | 7 |
| ProduceTime | 8 |
| ExpireTime | 9 |
| ResponsiblePerson | 10 |
| QualityGrade | 11 |
| ProductSet | 12 |

The index values in the index table can be arbitrary, thereby making the encoded XML document hard to interpret without an index table.

Based on the index table, an XML document is transformed into an intermediate data document referred to as an Encoded XML Document 815. An encoded XML Document corresponding to the XML document above, produced with the Index Table above, is:

```
<?xml version="1.0" encoding="UTF-8">
<!DOCTYPE 12 SYSTEM "12.dtd">
<12>
    <1>
        <2>XXXX</2>
        <3>45EF76345</3>
        <4>E3DF67</4>
        <5>AAA</5>
        <6>1988-12-28</6>
        <7>621</7>
        <8>2000-12-28</8>
        <9>2002-12-28</9>
        <10>Kelly De</10>
        <11>6</11>
    </1>
    <1>
        <2>XXXY</2>
        <3>45E003123</3>
        <4>9FD56</4>
        <5>BBB</5>
        <6>3.4</6>
        <7>621</7>
        <8>2000-02-28</8>
        <9>2002-02-28</9>
        <10>Kevin Smith</10>
        <11>8</11>
    </1>
</12>
```

Also, an encoded DTD file is generated based on the original DTD file. An encoded DTD file corresponding the DTD file shown previously and produced with the index table shown previously, is:

```
<?xml version="1.0" encoding="UTF-8"?>
<!ELEMENT 1 (2, 3, 4, 5, 6, 7, 8, 9, 10, 11)>
<!ELEMENT 1 (#PCDATA)>
<!ELEMENT 2 (#PCDATA)>
<!ELEMENT 3 (#PCDATA)>
<!ELEMENT 4 (#PCDATA)>
<!ELEMENT 5 (#PCDATA)>
<!ELEMENT 6 (#PCDATA)>
<!ELEMENT 7 (#PCDATA)>
<!ELEMENT 8 (#PCDATA)>
<!ELEMENT 9 (#PCDATA)>
<!ELEMENT 10 (#PCDATA)>
<!ELEMENT 11 (#PCDATA)>
<!ELEMENT 12 (1+)>
```

When the consumer decodes the document, the consumer can change the tag names to better correspond with consumer's own naming conventions.

In addition to controlling access, a further advantage of encoding the information is that the encoded tag names take up less space than the unencoded tag names, which are generally descriptive and can be quite long. The index values can be chosen to be compact such as in the simple numerical indexing sheme illustrated above.

Tags have limited memory or space. Thus, by using compact index values, more tracking information (e.g., attribute fields) can be included in the tag. Similarly, when the tracking information is being communicated across a network, the encoded information can be transmitted using less bandwidth than the unencoded version.

Figure 9:
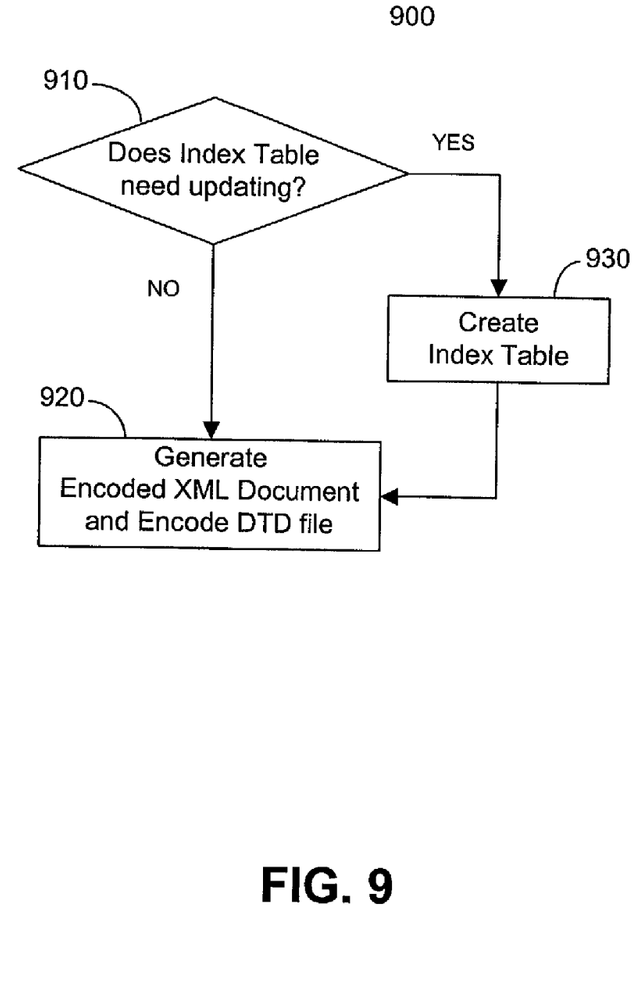
FIG. 9 shows a method for checking that the appropriate index table is used to create an Encoded XML document.

FIG. 9 shows a method for checking that the appropriate index table is used to create an encoded XML document. The system first checks to see if the index table needs updating (910). If not, an encoded XML document or encoded DTD file is created with the existing index table (920). If the index table need updating, a new index table is created and then used to create the encoded XML document or encoded DTD file (930).

The encoded XML document is transformed over a network or stored in a smart tag associated with a physical object. On the consumer side, a destination index table is used to decode the document. As for the index table and as shown in the following example, the destination index table relates tag names to index values:

| Tag Name | Index |
|---|---|
| Product | 1 |
| ProductType | 2 |
| ProductIdentification | 3 |
| VersionNumber | 4 |
| VendorName | 5 |
| ProduceTime | 8 |
| ExpireTime | 9 |
| ProductSet | 12 |

All the indexes in the destination index table must appear in the corresponding source index table, which was used to create the encoded document. However, all the indexes in the index table may not appear in the corresponding destination index table. The consumer of the XML document receives the tag names and indexes for only those attribute fields that the producer authorizes the consumer to share. For example, if the XML document is created by a manufacturer and the consumer is a retailer, and the manufacturer does not want the retailer to see the attribute fields called ResponsiblePerson and QualityGrade, then these indexes do not appear in the destination index table of the retailer.

The tag names associated with a particular index in the destination index table and its corresponding index table can be different. Therefore, the consumer can modify the tag names in order to make them consistent with its applications. For example, the consumer can replace ProductID with ProductIdentification, VersionNumber with VersionNumber, and VendorName with Vendor, as shown above. However the meaning of these tags in their associated applications should be the same.

Based on the destination index table and the encoded DTD file shown above, the consumer will see the following DTD file:

```
<?xml version="1.0" encoding="UTF-8"?>
<!DOCTYPE ProductSet SYSTEM "ProductSet.dtd">
<!ELEMENT Product (ProductType, ProductIdentification,
  VersionNumber, VendorName, SalePrice,
  ProducePlace, ProduceTime, ExpireTime)>
<!ELEMENT ProductType (#PCDATA)>
<!ELEMENT ProductIdentification (#PCDATA)>
<!ELEMENT VersionNumber (#PCDATA)>
<!ELEMENT VendorName (#PCDATA)>
<!ELEMENT SalePrice (#PCDATA)>
<!ELEMENT ProducePlace (#PCDATA)>
<!ELEMENT ProduceTime (#PCDATA)>
<!ELEMENT ExpireTime (#PCDATA)>
<!ELEMENT ProductSet (Product+)>
```

Based on the destination index table and the encoded XML document shown above, the consumer will see the following XML document:

```
<?xml version="1.0" encoding="UTF-8">
<!DOCTYPE ProductSet SYSTEM "ProductSet.dtd">
<ProductSet>
    <Product>
        <ProductType>XXXX</ProductType>
        <ProductIdentification>45EF76345</ProductIdentification>
        <VersionNumber>E3DF67</VersionNumber>
        <VendorName>AAA</VendorName>
        <SalePrice>1988-12-28</SalePrice>
        <ProducePlace>621</ProducePlace>
        <ProduceTime>2000-12-28</ProduceTime>
        <ExpireTime>2002-12-28</ExpireTime>
    </Product>
    <Product>
        <ProductType>XXXY</ProductType>
        <ProductIdentification>45E003123</ProductIdentification>
        <VersionNumber>9FD56</VersionNumber>
        <VendorName>BBB</VendorName>
        <SalePrice>3.4</SalePrice>
        <ProducePlace>621</ProducePlace>
        <ProduceTime>2000-02-28</ProduceTime>
        <ExpireTime>2002-02-28</ExpireTime>
    </Product>
</ProductSet>
```

A number of embodiments of the invention have been described. Nevertheless, it will be understood that various modifications may be made without departing from the spirit and scope of the invention. For example, a physical markup language such as PML, proposed by the MIT Auto-ID Center, may be used as described here to define special schemas. The methods described here can be applied with any markup language that is based on XML.

Item tracking is only one application of the systems and methods described above. The present invention can be applied to any context where multiple enterprises share the same pool of information, but do not share the same level of access (because of either authorization level or individual interest). For example, the present invention can be applied to a conventional publish-subscribe communication model where multiple entities subscribe to a shared pool of published information for a certain topic. Using the present invention, the producer can send out the same information, but system provides each consumer with only a subset of that information.

What is claimed is:

1. A method for communicating tracking information, the method comprising:
    creating, on a computer readable medium, tracking information for one or more items, the tracking information including one or more attributes of each item;
    accessing an index table, the index table including a set of coding schemes for encoding the tracking information, each coding scheme corresponding to a particular attribute in the tracking information;
    encoding the tracking information by encoding each instance of each attribute in the tracking information with a corresponding coding scheme from the set of coding schemes;
    sending the encoded tracking information to multiple recipients with different levels of access; and
    for each recipient,
        determining which attributes the recipient is authorized to access; and
        providing the recipient with a subset of the coding schemes, the subset including only coding schemes for attributes that the recipient is authorized to access.

2. The method of claim 1 wherein each attribute has a name describing the attribute and wherein encoding each attribute includes replacing the descriptive name of the attribute with a code name that is shorter than the descriptive name.

3. The method of claim 1 wherein the tracking information is received from one or more tags, each tag associated with a physical object, each tag containing a unique identification code and a plurality of attributes for the associated physical object.

4. The method of claim 1 wherein the tracking information is contained in an XML document.

5. The method of claim 1 wherein one recipient is an item tracking system.

6. A method for communicating information about an item, the method comprising:
    creating tracking information for an item, the tracking information including one or more attributes of the item;
    accessing an index table, the index table including a set of coding schemes for encoding the tracking information, each coding scheme corresponding to a particular attribute in the tracking information;
    encoding the tracking information by encoding each instance of each attribute with a corresponding coding scheme from the set of coding schemes;
    storing the encoded tracking information in a tag bound to the item;
    making the encoded tracking information stored on the tag accessible to multiple recipients with different levels of access;
    determining which attributes of the item a recipient is authorized to access; and
    providing the recipient with a subset of the coding schemes, the subset including only coding schemes for attributes of the item that the recipient is authorized to access.

7. The method of claim 6 wherein the encoded tracking information is stored as an XML document in the tag.

8. A method for accessing tracking information, the method comprising:
    receiving encoded tracking information for one or more items, the tracking information representing one or more attributes of each item, the tracking information having been encoded by encoding each instance of each attribute in the tracking information with a corresponding coding scheme from a set of coding schemes;
    receiving a subset of the coding schemes, the subset including only coding schemes corresponding to attributes that a recipient is authorized to access; and
    decoding a portion of the encoded tracking information using a processing device, by using the subset of the coding schemes to decode the attributes that the recipient is authorized to access.

9. The method of claim 8 wherein the encoded tracking information is stored in an XML document.

10. The method of claim 8 wherein the encoded tracking information is received from an item tracking system.

11. The method of claim 1, wherein the multiple recipients include recipients spread across different enterprises.

12. The method of claim 6, wherein the multiple recipients include recipients spread across different enterprises.

13. A method for communicating tracking information performed at least partially by a computer, the method comprising:
    accessing tracking information for an item, the tracking information including one or more attributes of the item;
    storing the tracking information in a document;
    accessing a coding index, the coding index including one or more coding schemes, each coding scheme corresponding to an attribute of the item;
    creating an encoded document for storing the tracking information for the item by encoding each attribute of the item with the attribute's corresponding coding scheme;
    determining which attributes of the item a recipient is authorized to access;
    sending the encoded document to the recipient; and
    sending a decoding index to the recipient, the decoding index including only coding schemes from the set of coding schemes that correspond to the attributes of the item that the recipient is authorized to access.

14. A method for accessing tracking information performed at least partially by a computer, the method comprising:
    receiving an encoded document for storing tracking information for an item, the tracking information including one or more attributes of the item, the tracking information encoded by encoding each attribute of the item with a corresponding coding scheme from a set of coding schemes;
    receiving a decoding index, the decoding index including only coding schemes from the set of coding schemes that correspond to attributes of the item that a recipient is authorized to access; and
    creating a decoded document for storing the tracking information for the item by decoding each attribute that the recipient is authorized to access with the attribute's corresponding coding scheme.

15. A system for encoding tracking information for an item, the tracking information including one or more attributes of the item, the system comprising:
    a coding index, the coding index including one or more coding schemes, each coding scheme corresponding to an attribute of the item; and
    a processor configured to:
        access the tracking information for the item;
        store the tracking information for the item in a document;
        access the coding index;
        create an encoded document for storing the tracking information for the item by encoding each attribute of the item with the attribute's corresponding coding scheme;
        determine which attributes of the item a recipient is authorized to access;
        send the encoded document to the recipient; and
        send a decoding index to the recipient, the decoding index including only coding schemes from the set of coding schemes that correspond to the attributes of the item that the recipient is authorized to access.

* * * * *